(12) United States Patent
Haffner et al.

(10) Patent No.: US 10,451,484 B2
(45) Date of Patent: Oct. 22, 2019

(54) TEMPERATURE SENSOR SYSTEM AND METHOD

(71) Applicant: General Electric Company, Schenectady, NY (US)

(72) Inventors: Ken Yves Haffner, Baden (CH); Guelru Kocer, Zurich (CH)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 15/404,271

(22) Filed: Jan. 12, 2017

(65) Prior Publication Data

US 2018/0195910 A1    Jul. 12, 2018

(51) Int. Cl.
| | | |
|---|---|---|
| *G01K 11/20* | (2006.01) | |
| *G01J 5/02* | (2006.01) | |
| *G01J 5/08* | (2006.01) | |
| *G01J 5/00* | (2006.01) | |

(Continued)

(52) U.S. Cl.
CPC ............ *G01J 5/026* (2013.01); *G01J 5/0014* (2013.01); *G01J 5/0088* (2013.01); *G01J 5/042* (2013.01); *G01J 5/046* (2013.01); *G01J 5/0896* (2013.01); *G01J 5/522* (2013.01)

(58) Field of Classification Search
CPC .... G01K 11/00; G01K 1/00; G01K 2011/322; G01K 1/026; G06F 15/20; G01J 5/00; G01J 1/0425; G01J 3/0218; G01N 2021/638; G01N 21/47; G01N 21/474; G01N 2201/088
USPC ......... 374/130, 131, 120, 121, 16, 161, 141, 374/144, 152, 1, 2; 356/43, 44
See application file for complete search history.

(56) References Cited

U.S. PATENT DOCUMENTS

| | | | | |
|---|---|---|---|---|
| 4,223,226 A | * | 9/1980 | Quick .................... | G01K 1/024 |
| | | | | 250/458.1 |
| 4,560,286 A | * | 12/1985 | Wickersheim ............ | G01J 5/48 |
| | | | | 250/461.1 |

(Continued)

FOREIGN PATENT DOCUMENTS

| | | | | |
|---|---|---|---|---|
| EP | 0898158 | | 2/1999 | |
| EP | 3301421 A1 | * | 4/2018 | ............... G01K 1/08 |

OTHER PUBLICATIONS

Ken Haffner, EVI-GTI Keynote, Optical Measurement Technologies in Thermal Power Industry, Nov. 26, 2013, pp. 1-44.

(Continued)

*Primary Examiner* — Gail Kaplan Verbitsky
(74) *Attorney, Agent, or Firm* — Fletcher Yoder, P.C.

(57) ABSTRACT

The temperature sensor includes a light pipe and a cap configured to be positioned within a flow path of a fluid. The cap includes a material configured to emit radiation based on a temperature of the material. A light source is configured to emit light through the light pipe toward the cap, and a detector is configured to receive the radiation emitted by the material of the cap and to generate a first signal based on the received radiation emitted by the material. The detector is configured to generate a second signal indicative of a light-induced delta temperature caused by the light emitted toward the inner surface of the cap. The system also includes a controller configured to determine a condition of the temperature sensor based on the first signal and the second signal.

21 Claims, 7 Drawing Sheets

(51) Int. Cl.
*G01J 5/04* (2006.01)
*G01J 5/52* (2006.01)

(56) References Cited

U.S. PATENT DOCUMENTS

| | | | | |
|---|---|---|---|---|
| 4,770,544 A * | 9/1988 | Mossey | ............... | G01J 5/0014 374/130 |
| 4,907,895 A * | 3/1990 | Everest | ............... | G01J 5/62 356/43 |
| 5,265,036 A * | 11/1993 | Suarez-Gonzalez | ............... | G01J 5/0022 356/45 |
| 5,348,396 A * | 9/1994 | O'Rourke | ............... | G01K 11/3206 374/130 |
| 5,928,222 A * | 7/1999 | Kleinerman | ............... | G01J 5/08 374/E11.017 |
| 6,045,259 A * | 4/2000 | Djeu | ............... | G01K 11/3213 374/161 |
| 6,422,745 B1 * | 7/2002 | Glasheen | ............... | G01J 5/0014 374/121 |
| 7,593,789 B2 * | 9/2009 | Gougerot | ............... | A61H 33/005 219/412 |
| 8,096,704 B2 * | 1/2012 | Riza | ............... | G01J 5/0014 356/43 |
| 8,240,913 B2 * | 8/2012 | Zheng | ............... | F01D 17/02 374/131 |
| 8,308,357 B2 * | 11/2012 | Kinugasa | ............... | G01K 11/3213 374/120 |
| 8,432,440 B2 * | 4/2013 | Krull | ............... | F23N 5/082 348/83 |
| 8,570,505 B2 * | 10/2013 | Baleine | ............... | G01B 11/14 356/237.1 |
| 9,921,113 B2 * | 3/2018 | Loewen | ............... | G01K 11/32 |
| 2004/0104336 A1 * | 6/2004 | Melnyk | ............... | G01D 5/268 250/227.14 |
| 2007/0006663 A1 * | 1/2007 | Zerwekh | ............... | G01K 11/3206 73/800 |
| 2007/0077499 A1 * | 4/2007 | Ikuta | ............... | B82Y 10/00 430/5 |
| 2008/0144698 A1 * | 6/2008 | Cloutier | ............... | G01D 5/268 374/161 |
| 2009/0245326 A1 * | 10/2009 | Kinugasa | ............... | G01K 11/3213 374/159 |
| 2012/0085175 A1 * | 4/2012 | Johansson | ............... | G01L 9/0079 73/705 |
| 2013/0206760 A1 * | 8/2013 | Susko | ............... | G01D 11/245 220/88.3 |
| 2015/0113942 A1 * | 4/2015 | Hockaday | ............... | G01K 13/02 60/226.1 |
| 2015/0117493 A1 * | 4/2015 | Hockaday | ............... | F01D 17/085 374/161 |
| 2015/0177132 A1 * | 6/2015 | Pechstedt | ............... | G01K 11/3206 356/517 |
| 2018/0087975 A1 * | 3/2018 | Ellis | ............... | G01K 1/08 |

OTHER PUBLICATIONS

U.S. Appl. No. 15/279,090, filed Sep. 28, 2016, Andrew David Ellis.
U.S. Appl. No. 15/279,075, filed Sep. 28, 2016, Donald W. Shaw.

* cited by examiner

TEMPERATURE SENSOR SYSTEM AND METHOD

BACKGROUND

The subject matter disclosed herein relates to generally temperature sensors, and more particularly, to a temperature sensor for use in high temperature environments.

Gas turbine systems typically include at least one gas turbine engine having a compressor, a combustor, and a turbine. The combustor is configured to combust a mixture of fuel and compressed air to generate hot combustion gases, which, in turn, drive blades of the turbine. A temperature of exhaust gas produced by the gas turbine engine may vary depending on a configuration of the gas turbine engine, the fuel, and/or fuel-to-air ratios, among other combustion parameters. In certain applications, the temperature of the exhaust gas may be estimated, or may be measured using thermocouples. The temperature of the exhaust gas may be at temperature ranges that may be difficult to measure using existing temperature measurement techniques (e.g., applications). Additionally, the temperature measurement techniques may be unreliable (e.g., produce unreliable data over time). Therefore, it may be desirable to improve existing temperature measurement techniques for determining exhaust gas temperatures.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a system includes a temperature sensor configured to measure a temperature of a fluid. The temperature sensor includes a housing supporting a light pipe and including a cap configured to be positioned within a flow path of the fluid. The cap includes a material configured to emit radiation based on a temperature of the material. The temperature sensor also includes a light source configured to emit light through the light pipe toward an inner surface of the cap and a detector configured to receive the radiation emitted by the material of the cap and to generate a first signal indicative of a first temperature of the cap based on the received radiation emitted by the material. The detector is configured to generate a second signal indicative of a light-induced delta temperature caused by the light emitted toward the inner surface of the cap. The system also includes a controller configured to determine a condition of the temperature sensor based on the first signal and the second signal.

In a second embodiment, a system includes a temperature sensor configured to measure a temperature of a fluid within a combustor of a gas turbine engine. The temperature sensor includes a housing supporting a light pipe and including a cap configured to be positioned within a flow path of the fluid. The cap includes a material that emits radiation based on a temperature of the material. Additionally, a longitudinal axis of the cap is substantially parallel to the flow path of the fluid through the combustor.

In a third embodiment, a method includes receiving, at a detector, a first radiation emitted by a cap of a temperature sensor positioned within a fluid, wherein the cap comprises a material configured to emit radiation based on a temperature of the material. The method also includes receiving, at a controller, a first signal generated by the detector based on the first radiation emitted by the cap of the temperature sensor. The method includes providing, using the controller, a light drive signal to cause a light source to emit light toward an inner surface of the cap. The method includes receiving, at the detector, a second radiation emitted by the cap of the temperature sensor while the temperature of the cap is increased due to the emitted light from the light source, and receiving, at the controller, a second signal generated by the detector based on the second radiation emitted by the cap of the temperature sensor while the temperature of the cap is increased due to the emitted light from the light source. The method further includes determining, using the controller, a condition of the temperature sensor based on the first signal and the second signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
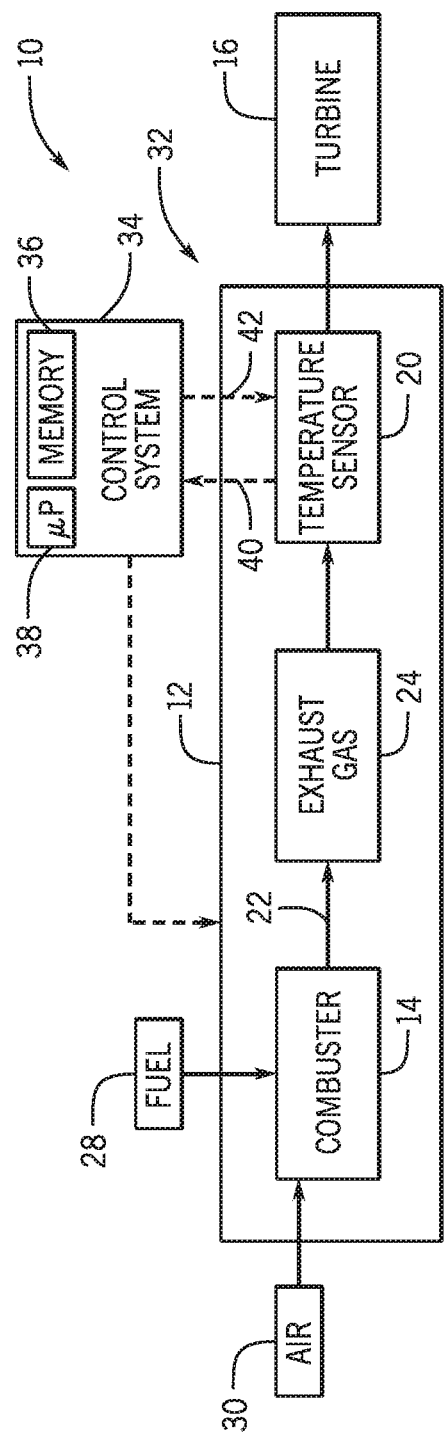
FIG. 1 is a block diagram of a gas turbine system including a temperature sensor that measures a temperature of an exhaust gas generated in the gas turbine system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are generally directed toward systems and methods for measuring fluid temperatures (e.g., exhaust gas temperature) with a temperature sensor and determining a condition of the temperature sensor. For example, in gas turbine systems, one or more gas turbine engines may combust a fuel/oxidant mixture to produce combustion gases (e.g., exhaust gases) for driving one or more turbine stages, each having a plurality of blades. Depending on a number of factors, such as the type of fuel that is combusted as well as various combustion parameters (e.g., fuel and/or airflow, pressure, etc.) and gas turbine engine configurations, a temperature of the exhaust gas resulting from the combustion process may vary. Evaluating a temperature of the exhaust gas generated by various gas turbine engine configurations and operating (e.g., combustion) parameters may facilitate design of system components downstream of a combustor of the gas turbine engine. Additionally, in existing gas turbine engines, it may be desirable to monitor the exhaust gas temperatures to monitor combustion parameters of the gas turbine system.

It is now recognized that measurement of the temperature of the exhaust gas produced in the gas turbine engine during combustion also allows for a more direct evaluation of operational parameters of the gas turbine system. In addition, other operating parameters may be adjusted in response to these direct temperature measurements. For example, an amount of cooling fluid (e.g., air) used to cool system components downstream of the gas turbine engine may be adjusted and/or redirected to other system components based on such temperature measurements. In addition, certain gas turbine engine models may generate an exhaust gas having a temperature that may not require a substantial amount of cooling fluid to cool the exhaust gas and/or downstream system components (e.g., system components downstream of a combustor of the gas turbine engine) in contact with the exhaust gas. Therefore, an amount of air generally used to cool the exhaust gas and/or downstream system components downstream of the combustor may be decreased compared to gas turbine engines that generate exhaust gases having temperatures above a desired threshold. Accordingly, at least a portion of the air used to cool the exhaust gas and/or system components downstream of the combustor may be redirected to the combustor of the gas turbine engine or other system processes that may utilize the air. Moreover, knowing the temperature of the exhaust gas exiting the gas turbine engine may facilitate selection of materials used to fabricate the system components downstream of the gas turbine engine.

In some configurations, exhaust gas temperatures may be evaluated in a combustion testing laboratory using a combustion testing apparatus that is representative of an engine configuration associated with a particular gas turbine engine model. The combustion testing apparatus may simulate performance of the gas turbine engine model that may be incorporated into a particular gas turbine system. One way of measuring exhaust gas temperatures in the combustion testing apparatus is with a thermocouple. For example, Type B thermocouples may be used with the combustion testing apparatus to directly measure the temperature of the exhaust gas exiting a combustor of the combustion testing apparatus. Thermocouples, such as Type B thermocouples, are manufactured from metallic materials such as a mixture of platinum (Pt) and rhodium (Rh). Type B thermocouples are suitable for measuring fluid temperatures up to approximately 1700° C., which is the highest temperature limit for thermocouples. However, certain large frame heavy-duty gas turbine engines having a megawatt range greater than 50 megawatts (MW) (e.g., non-Aero derivative gas turbine engines) may generate exhaust gas having temperatures in excess of 1700° C. As such, during combustion testing of large frame heavy duty gas turbine engines, the thermocouples used to measure the exhaust gas temperature in the combustion testing apparatus are generally replaced after a single use, thereby increasing the overall cost of combustion testing. The measurements using these thermocouples may also be inaccurate at such temperatures. In accordance with present embodiments, it is now recognized that temperature sensors that use optical materials (e.g., optically non-transparent materials) that are heat resistant, such as, for example, ceramics, silicon carbide, steel, or a combination thereof, may be used for high temperature measurement applications. The temperature sensors disclosed herein may include non-metallic refractory materials (e.g., ceramics) that may be more appropriate for use in temperature sensing applications that are unsuitable for thermocouples.

The temperature sensors may have a temperature threshold that is above 1700° C. Therefore, using temperature sensors for measuring exhaust gas temperatures in the combustion testing apparatus or any other high temperature environment may mitigate the undesirable costs associated with replacement of thermocouples used to measure high temperature fluids (e.g., exhaust gas) after each use. Additionally, the temperature sensors may provide a more accurate temperature measurement compared to traditional thermocouples at temperatures above 1700° C.

Further, it is desirable to determine whether the measurements provided by the temperature sensors are reliable. In applications in which the temperature sensors are not readily accessible (e.g., inside a combustor), the temperature sensors may malfunction, while still outputting measurements. However, the data from malfunctioning temperature sensors may be unreliable and/or inaccurate. Further, actions may be taken to fix or repair the temperature sensors if it is known that the temperature sensors have malfunctioned. Therefore, it may be desirable to fabricate a temperature sensor that may provide more accurate temperature readings at temperatures above 1700° C. It may also be desirable to fabricate a temperature sensor that that may identify a condition of the temperature sensor by determining when the data quality has declined (e.g., beyond a threshold or acceptable level). In certain embodiments of the present disclosure, the temperature sensor may include a cap configured to be positioned in a fluid path and that is formed of a material configured to emit radiation based on a temperature of the cap. The temperature sensor may include a detector that is configured to detect the radiation emitted from the cap of the temperature sensor and to generate a signal based on the detected radiation. In some embodiments, the detector may receive a first emitted radiation (e.g., static radiation or baseline radiation) and may generate a first signal indicative of a first temperature of the cap (e.g., cap temperature, absolute temperature, static temperature, baseline temperature value, initial temperature value, or black-body radiation temperature) using Planck's law, and the first temperature may be correlated to a fluid temperature of the fluid that is in contact with the cap. Further, the temperature sensor may include a light source, which is configured to emit light (e.g., modulated light) typically of a constant and known wavelength into a cavity defined by the cap. The light may increase the temperature of the cap (e.g., due to heat transfer), which is a light-induced change in temperature (e.g., light-induced delta temperature or light-induced increase in temperature). For a given (e.g., constant) power of the light source or intensity of the emitted light, the increase in temperature depends on the current temperature of the cap. For example, the higher the temperature of the cap, the smaller the temperature increase due to the light. In some embodiments, the detector may then detect a second emitted radiation (e.g., light-adjusted radiation or light-affected radiation) and generate a second signal indicative of the light-induced change in temperature of the cap due to emission of the light into the cavity. The second signal may be used to calculate the light-induced change in temperature using Planck's law. In some embodiments, a controller may determine the temperature of the fluid and/or a condition of the temperature sensor (e.g., whether the cap and/or temperature sensor are healthy, damaged, present, missing, or any combination thereof) based on the first signal and the second signal. For example, the controller may process the first signal to determine the temperature of the fluid (e.g., using Planck's law and/or other algorithms to correlate the first temperature to the fluid temperature), and the controller may process the first signal and/or the second signal to determine whether the light-induced change in temperature corresponds to an expected light-induced change in temperature (e.g., according to Planck's law). If the light-induced change in temperature does not correspond to the expected light-induced change in temperature, the controller may determine that the temperature sensor is not functioning properly. In some embodiments, if the emitted radiation (e.g., the second emitted radiation) is not received at the detector, the controller may determine that the cap of the temperature sensor is missing or that the temperature sensor is otherwise not functioning properly. If the temperature sensor is not present and/or healthy, the controller may provide an alarm. Accordingly, present embodiments include a temperature sensor that may be used to measure the temperature of a fluid of interest, even when the temperature of the fluid is greater than the suitable temperature range for traditional thermocouples, while also recognizing the quality of the data the temperature sensor provides.

With the foregoing in mind, FIG. 1 is a block diagram of an example gas turbine system 10 that includes a gas turbine engine 12 having a combustor 14 and a turbine 16. In certain embodiments, the gas turbine system 10 may be all or part of a power generation system. In other embodiments, the gas turbine system 10 may be part of a laboratory combustion testing apparatus. The gas turbine system 10 also includes a monitoring system 32 that includes one or more temperature sensors 20 positioned along a flow path of a fluid, such as a flow path 22 of an exhaust gas 24 generated in the combustor 14. For example, in the illustrated embodiment, the one or more temperature sensors 20 are located between the combustor 14 and the turbine 16. However, in other embodiments, the one or more temperature sensors 20 may be located downstream of the turbine 16 or at any other suitable location within the gas turbine system 10. Additionally, the temperature sensors 20 may be located inside the combustor 14 or located at another portion of the gas turbine system 10 (e.g., engine oil reservoirs, heat exchangers) to measure the temperature of any of a variety of fluids. Multiple temperature sensors 20 may be distributed at various axial and circumferential locations of the combustor or other components.

In operation, the gas turbine system 10 may use liquid or gas fuel, such as natural gas and/or a hydrogen-rich synthetic gas, to run the gas turbine system 10. As shown in FIG. 1, fuel 28 and air 30 (e.g., compressed air) enter the combustor 14. For example, one or more fuel nozzles may inject a fuel-air mixture into the combustor 14 in a suitable ratio for desired combustion, emissions, fuel consumption, power output, and so forth. The combustion of the fuel 28 and the air 30 may generate the hot pressurized exhaust gas 24 (e.g., combustion gases), which may then be utilized to drive one or more turbine blades within the turbine 16. For example, in operation, the combustion gases (e.g., the exhaust gas 24) flowing into and through the turbine 16 may flow against and between the turbine blades, thereby driving the turbine blades and, thus, a shaft of the gas turbine engine 12 into rotation to drive a load, such as an electrical generator in a power plant. In embodiments where the system 10 is a testing apparatus, the turbine 16 may not necessarily be in place.

The one or more temperature sensors 20 may be used to measure the temperature of the exhaust gas 24 within the gas turbine system 10. For example, the one or more temperature sensors 20 may measure the temperature of the exhaust gas 24 within or immediately downstream of the combustor 14, upstream of the turbine 16 (e.g., between the combustor 14 and the turbine 16), downstream of the turbine 16 (e.g., in an exhaust duct), or any other suitable location within the gas turbine system 10. In other words, the sensors 20 may measure the temperature of fluid inside the gas turbine system at any location for which it is desirable to measure the temperature. Depending on the configuration of the gas turbine engine 12 and/or the fuel used in the gas turbine system 10, the temperature of the exhaust gas 24 may be above a temperature (e.g., 1700° C.) suitable for using existing thermocouples. For example, certain large frame heavy duty gas turbine engines may generate exhaust gases having temperatures above 1700° C. As discussed above, thermocouples are generally used to measure the temperature of the exhaust gas generated in combustion systems (e.g., the gas turbine system 10, combustion testing apparatus, etc.). However, Type B thermocouples, which have the highest temperature tolerance compared to other types of thermocouples, are not suitable for measuring temperatures of fluids (e.g., the exhaust gas 24) that are above 1700° C. Additionally, the metallic materials used to manufacture thermocouples may not be sufficiently durable to withstand fluid temperatures exceeding 1700° C. The temperature sensors of the present disclosure may be manufactured from non-metallic refractory materials that may be more durable and/or resistant to fluid temperatures above 1700° C. compared to the metal-based thermocouple temperature sensors.

The present embodiments include a monitoring system having a temperature sensor 20. The monitoring system may be configured to determine the temperature of a fluid of interest (e.g., exhaust gas 24) and/or to determine a condition of the temperature sensor 20. As discussed in further detail below with reference to FIG. 2, the temperature sensor 20 may include a cap (e.g., black body radiator) that emits radiation (e.g., infrared light) as a function of the temperature of the cap. The emitted radiation is detected by a detector, which sends a signal to a control system. Additionally, the temperature sensor 20 may include a light source coupled to the light pipe. The light source may send light (e.g., modulated light) through the light pipe into a cavity defined by the cap that is in contact with the exhaust gas 24. A portion of the light will reflect back to the light pipe (e.g., Fresnel reflections), which transmits the light to the detector, which sends a signal to the control system. Another portion of the light will enter the cavity and increase the temperature of the cap (e.g., due to heat transfer), and the subsequently emitted radiation may be detected by the detector, which sends a signal to the control system. Thus, in accordance with certain embodiments, the emitted radiation and/or the reflected light may be measured over time to determine the temperature of the exhaust gas 24 and/or the condition of the temperature sensor 20.

The illustrated monitoring system 32 also includes a control system 34 (e.g., electronic control system) configured to control operation of the gas turbine system 10, determine the temperature of the exhaust gas 24 based on the temperature measurements obtained from the one or more temperature sensors 20, and/or determine a condition of the one or more temperature sensors 20. The control system 34 may independently control operation of the gas turbine system 10 by electrically communicating with sensors, control valves, and pumps, or other flow adjusting features throughout the gas turbine system 10. The control system 34 may include a distributed control system (DCS) or any computer-based workstation that is fully or partially automated. For example, the control system 34 can be any device employing a general purpose computer or an application-specific device, both of which may generally include memory circuitry 36 storing one or more instructions for controlling operation of the gas turbine system 10, determining combustion parameters, determining a temperature of the exhaust gas 24, and determining a condition of the temperature sensors 20 among others. The memory 36 may store algorithms used to determine the temperature of the exhaust gas 24 and/or the condition of the temperature sensors 20 based on data obtained by the one or more temperature sensors 20. The processor may include one or more processing devices (e.g., microprocessor 38), and the memory circuitry 36 may include one or more tangible, non-transitory, machine-readable media collectively storing instructions executable by the processor to control actions described herein.

In certain embodiments, the control system 34 may include separate controllers (e.g., having respective processor and memory) for controlling the gas turbine system 10 and the temperature sensor 20. In one embodiment, the temperature sensor 20 includes its own controller that may be configured to control the light source and/or to determine the temperature and/or a condition of the temperature sensor 20. For example, a temperature controller may be disposed within a housing of the temperature sensor 20. The temperature controller may communicate with another controller of the control system 34 to provide data to facilitate control of operational parameters of the gas turbine system 10 based on the temperature of the exhaust gas 24.

Additionally or alternatively, the control system 34 of the gas turbine system 10 may provide an output (e.g., a visual or audible output, such as an alarm, or a control signal) to perform functions, such as notifying the operators of the system 10 to adjust operating parameters, perform service, or otherwise cease operating the system 10 based on the determined temperature and/or condition of the temperature sensor 20. In some embodiments, the control system 34 may also implement corrective actions specifically relating to adjusting fuel/air ratios, exhaust temperature, flow rates of cooling air, or any other suitable parameter of the gas turbine system 10 based on the determined temperature and/or condition of the temperature sensor 20.

For example, in certain embodiments, the control system 34 may use information provided via one or more input signals 40 from one or more sensors (e.g., the temperature sensor 20) of the gas turbine system 10 to execute instructions or code contained on the memory 36 and generate one or more output signals 42 to various flow control devices to control a flow of fluids (e.g., the fuel 28 and the air 30) within the gas turbine system 10. In one embodiment, the control system 34 may control operation of optical components (e.g., light source) of the one or more temperature sensors 20 to facilitate determination of the temperature of the exhaust gas 24 and/or the condition of the temperature sensors 20.

Figure 2:
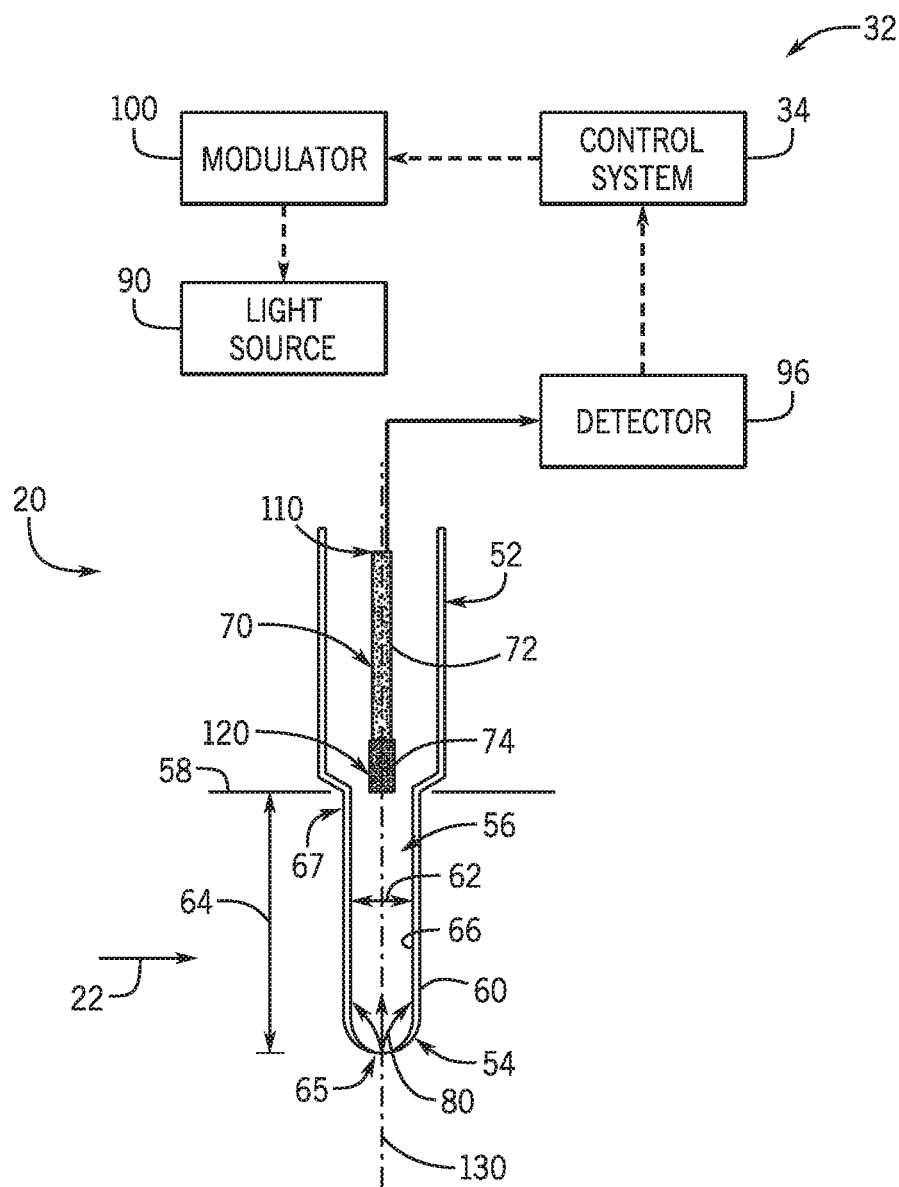
FIG. 2 is a schematic diagram of the temperature sensor of FIG. 1 showing radiation emitted by a cap, in accordance with an embodiment of the present disclosure.

FIG. 2 illustrates an embodiment of one temperature sensor 20 that may be used in the gas turbine system 10. The temperature sensor 20 may be suitable for measuring temperatures of a wide variety of fluids, especially those expected to have a temperature above ranges that are generally appropriate for traditional thermocouples. Accordingly, the temperature sensor 20 may have a cooling system inside and/or outside of the temperature sensor 20 configured to cool the components of the temperature sensor 20. For example, the cooling system may include a pump that moves cooling fluid (e.g., air, nitrogen, cooled exhaust gas, and/or water) along at least a portion of the temperature sensor 20 to cool the portion of the temperature sensor 20.

In certain embodiments, the temperature sensor 20 includes a housing 52. The housing may be an annular, cylindrical, or another three-dimensional shape suitable for the operating conditions. The housing 52 may also include a cap 54 that defines a cavity 56 (e.g., space, hollow, volume) inside the cap 54. The cap 54 may be coupled to the housing 52 (e.g., welded, snapped, screwed), or the cap 54 may be integrally formed from the same material as the housing 52. As depicted, the cap 54 protrudes from a surface 58 (e.g., a combustor wall) of the gas turbine system 10. For example, the housing 52 may be supported on one side (e.g., outer side) of the surface 58 and the cap 54 may extend from another side of the surface 58 into the flow path 22 of the exhaust gas 24. From this position, an outer surface 60 of the cap 54 is in contact with the exhaust gas 24 and may absorb energy from the exhaust gas 24.

In certain embodiments, the cap 54 may be constructed of a material that may emit radiation based on the temperature of the cap 54. The emitted radiation may be released regardless of the type of energy that energizes the cap 54 (e.g., energy transferred by conduction, convection, and/or radiation). In some embodiments, the radiation is emitted from an inner surface 66 of the cap 54. Thus, the cap 54 may be a black body radiator. Furthermore, based on an inner diameter 62 and a length 64 of the cavity 56 (e.g., along a longitudinal axis 130), the cavity 56 may be a Planck cavity. The cap 54 may also have a decreased thickness (e.g., thinner wall) at an end 65 (e.g., tip) of the cap 54 as compared to a portion 67 of the cap 54 proximate to the housing 52, such that the time for the cap 54 to reach equilibrium with the fluid of interest is decreased and the temperature sensor 20 has a swift response time.

The temperature sensor 20 disclosed herein is suitable for use in high-temperature environments (e.g., environments having temperatures above 1700° C.). For example, the temperature sensor 20 may be used to measure temperatures between approximately 1500° C. and approximately 2500° C. However, the temperature sensor 20 may also measure temperatures below 1500° C., similar to thermocouples. As an example, some or all of the components of the temperature sensor 20 may be manufactured from non-metallic materials that are durable at temperatures up to approximately 2500° C. For example, the housing 52, the cap 54, or both, may be manufactured from refractory materials (e.g., ceramic) including, but not limited to, oxides (e.g., aluminum oxide, calcium oxide), silica, magnesia, carbides (e.g., silicon carbide, tungsten carbide), zirconia, graphite, boron nitride, corrosion-resistant metal alloy (e.g., HASTEL-LOY®) or any other suitable high temperature material. In certain embodiments, the housing 52, the cap 54, or both, are manufactured from materials having a low coefficient of thermal expansion (e.g., between approximately 3 and 6). For example, the cap 54 may be manufactured from materials such as, but not limited to, tungsten or vanadium.

Other components of the sensor 20 may be disposed inside the housing 52, such as a light pipe 70 (e.g., optical fiber). The light pipe 70 may include a prolongation cable 72 and an optical core 74. The prolongation cable 72 may include a base material (e.g., non-doped yttrium aluminum garnet (YAG) crystal, sapphire crystal, quartz crystal, zirconia fibers, silica-silica fibers) designed to propagate light from a first end 110 of the light pipe 70 to a second end 120 of the light pipe 70 and vice versa. The optical core 74 may focus light or energy coming from either end of the light pipe 70. The temperature sensor 20 and its components may be defined with reference to the longitudinal axis 130 of the temperature sensor 20. In some embodiments, the light pipe 70 may be a flexible light pipe, a rigid light pipe, or a different type of light pipe configured to transmit light from one side of the temperature sensor 20 to another side.

In some embodiments, the temperature sensor 20 may include a detector 96 configured to receive radiation or light from the light pipe 70. In particular, the detector 96 may receive radiation or light as an input, and may generate one or more outputs (e.g., output signals, voltages) indicative of the frequency, intensity, amplitude, or other properties of the radiation or light.

Additionally, the monitoring system 32 may include the control system 34, and the detector 96 receives light from the light pipe 70 and transmits output signals to the control system 34. As noted above, in certain embodiments, the temperature sensor 20 includes a controller that processes the signals from the detector 96 and outputs signals to another controller of the control system 34. The signals may be used by the control system 34 to determine temperatures of the exhaust gas 24, and/or as described in further detail below with reference to FIG. 3, to determine a condition of the temperature sensor 20. Then, the control system 34 may control operational parameters of the gas turbine system 10 based on the determined temperature of the exhaust gas 24 and/or condition of the temperature sensor 20.

In operation, the control system 34 may determine a first temperature (e.g., cap temperature, absolute temperature, static temperature, baseline temperature, initial temperature, or black-body radiation temperature) of the cap 54 based on radiation 80 (e.g., static absolute radiation, a baseline radiation, an initial radiation, or a first radiation) emitted by the cap 54 of the temperature sensor 20. As described above, the cap 54 acts as a black body radiator that emits radiation due to the heat of the fluid in contact with the outer surface 60 of the cap 54. Radiation 80 is emitted from the inner surface 66 of the cap 54 and is transmitted by the light pipe 70 to the detector 96. The detector 96 generates and transmits signals to the control system 34 indicative of at least one property of the radiation 80 (e.g., intensity, amplitude, frequency). From the signals, the control system 34 may then calculate the first temperature of the cap 54, which may be correlated (e.g., using various algorithms, empirical data, models, or the like) to the fluid temperature of the exhaust gas 24. The first temperature may be calculated via Planck's law.

As shown, the monitoring system 32 may also include a light source 90 and/or a modulator 100, and the control system 34 may output signals to control the modulator 100 and/or to control the light source 90. In some embodiments, a controller, the light source 90, the detector 96, and/or the modulator 100 may be disposed within the housing 52 of the temperature sensor 20, such that the temperature sensor 20 may be portable.

Figure 3:
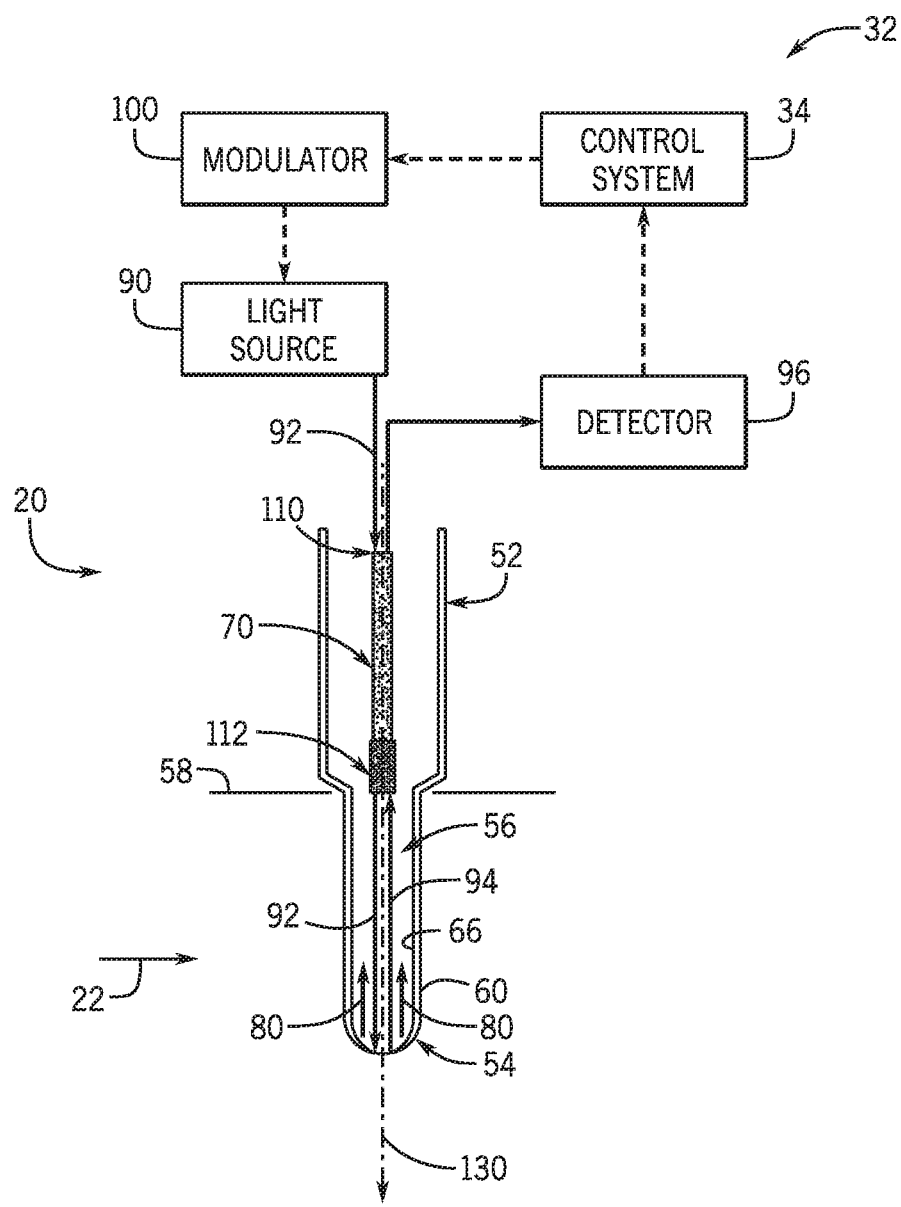
FIG. 3 is a schematic diagram of the temperature sensor of FIG. 1 showing light emitted by a light source, in accordance with an embodiment of the present disclosure.

FIG. 3 illustrates an embodiment of one temperature sensor 20 that may be used in the gas turbine system 10 to facilitate determination of a condition of the temperature sensor 20 based on a light-induced change in temperature (e.g., light-induced delta temperature or a light-induced increase in temperature). As discussed in more detail below, in some embodiments, the light-induced change in temperature may be compared to an expected light-induced change in temperature (e.g., based at least in part on characteristics, such as the intensity and wavelength, of the emitted light, the first temperature, and Planck's law) to determine a condition of the temperature sensor 20. The temperature sensor 20 is depicted in a manner similar to the temperature sensor of FIG. 2.

As shown, the monitoring system 32 may include the modulator 100. The modulator 100 may be any suitable modulator and may be controlled by the control system 34. For example, the activated modulator 100 may provide modulated light drive signals to the light source 90 to cause the light source 90 to emit modulated light (e.g., frequency-modulated light). The modulator 100 may modulate signals by digital modulation methods (e.g., phase-shift keying, frequency-shift keying, amplitude-shift keying, quadrature amplitude modulation) or other methods to produce modulated emitted light 92. Additionally, the light from the light source 90 may be kept constant (e.g. via closed-loop feedback) so that the control system 34 may calculate how much energy is added to system and account for the added energy in determination of the expected light-induced change in temperature. In certain embodiments, the light source emits constant light or a light with a defined power output, respectively with a controlled power output.

As shown, the monitoring system 32 may include the light source 90 (e.g., an ultraviolet (UV) lamp, laser, light emitting diode (LED)) that, when activated, emits emitted light 92 (e.g., modulated light) toward the light pipe 70. The emitted light 92 may enter the first end 110 of the light pipe 70, travel through the light pipe 70, and be transmitted into the cavity 56 from the second end 120 of the light pipe 70. The emitted light 92 may increase the temperature of the cap 54 (e.g., due to heat transfer), and the cap 54 may emit radiation 94 (e.g., a light-induced change in radiation) indicative of the increased temperature of the cap 54 caused by the emitted light 92. Thus, a second emitted radiation (e.g., a light-adjusted radiation or a light-affected radiation) including both the radiation 80 and the radiation 94 then enters the second end 120 of the light pipe 70 and transmits to the detector 96. Once the detector 96 detects the second emitted radiation, the detector 96 may send signals to the control system 34 indicative of characteristics of the radiation 94. As discussed in more detail below, the characteristics of the radiation 94 may be utilized by the control system 34 to determine the light-induced change in temperature (e.g., using Planck's law). The control system 34 may provide light drive signals to cause the light source 90 to emit the light 92 continuously, periodically, (e.g., every 0.5, 1, 3, 5, 10, 30, 60, 90, minutes or more), and/or based on operator input, for example.

Figure 4:
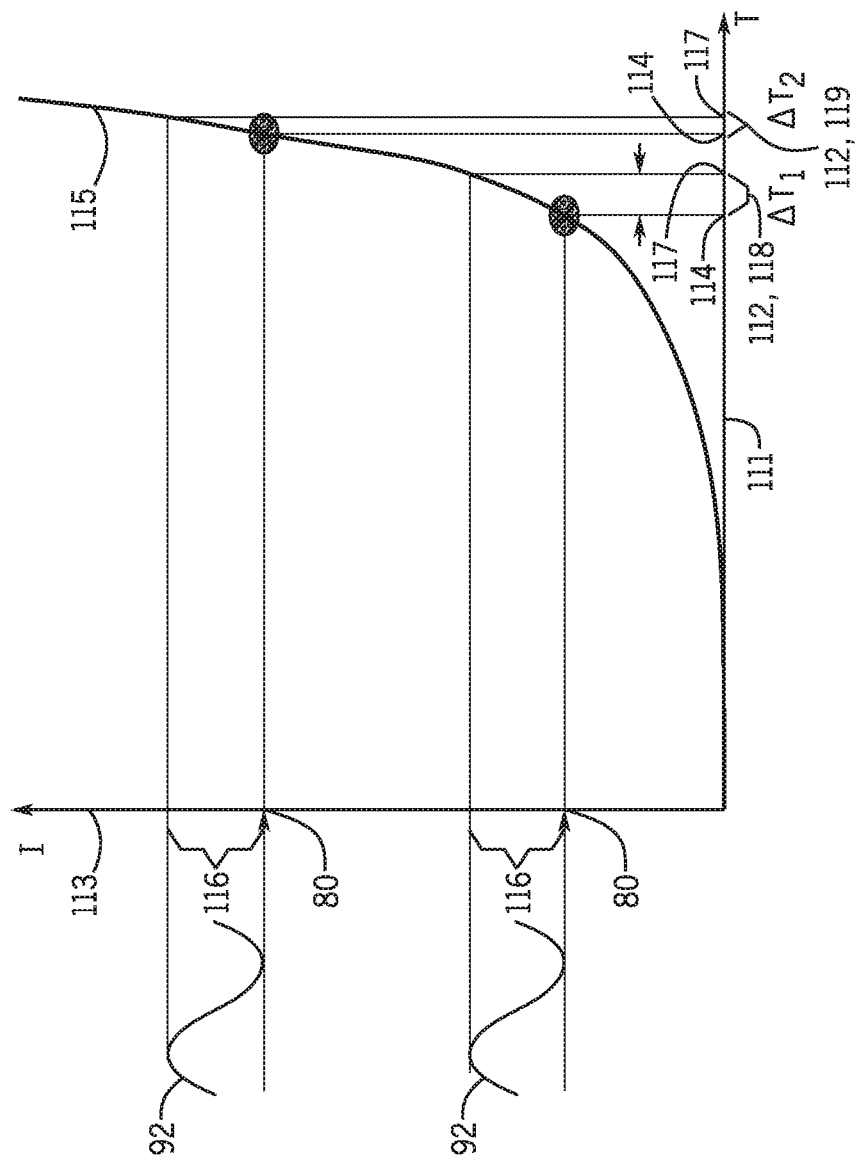
FIG. 4 is a graphical representation of a light-induced delta temperature that may be detected using the temperature sensor of FIG. 1, in accordance with an embodiment of the present disclosure.

FIG. 4 is a graphical representation of a light-induced change in temperature 112 that may be measured using the temperature sensor 20, in accordance with an embodiment of the present disclosure. As illustrated, a horizontal axis 111 represents temperature and a vertical axis 113 represents an intensity of radiation. As noted above with reference to FIGS. 2 and 3, the cap 54 emits radiation (e.g., radiation 80) based on the temperature of the cap 54, and this emitted radiation 80 may be utilized to calculate the first temperature 114 (e.g., using Planck's law). When the emitted light 92 (e.g., constant emitted light) is provided to the cavity 60, the radiation 94 is detected with (e.g., in addition to) the radiation 80 (e.g., a light-induced change in radiation 116). The control system 34 may calculate the light-induced change in temperature 112 (e.g., using Planck's law) from the radiation (e.g., the light-induced change in radiation 116) received at the detector 96. For example, in the absence of the emitted light 92 (e.g., when the light source 90 is inactive or at a minimum of sinusoidal wave of the emitted light 92), the radiation 80 emitted by the cap 54 may be detected by the detector 96 and processed by the control system 34 using Planck's law to determine the first temperature 114. When the emitted light 92 is provided to the cavity 60, the radiation 94, in addition to the radiation 80, is received at the detector 96 (e.g., the light-induced change in radiation 116). In some embodiments, the radiation 94 and the emitted radiation 80 may be isolated (e.g., split from) one another, and the emitted radiation 80 may be utilized to calculate the first temperature 114, and the light-induced change in radiation 116 may be utilized to calculate a second temperature 117 (e.g., light-induced temperature value or light-adjusted temperature value) and/or the light-induced change in temperature 112 (e.g., using Planck's law). As shown, the light-induced change in temperature 112 varies with the temperature of the cap 54 (e.g., the light-induced change in temperature 112 is less at higher first temperatures 114). For example, a first light-induced change in temperature 112, 118 at a lower temperature of the cap 54 is greater than a second light-induced change in temperature 112, 119 at a higher temperature of the cap 54. In some embodiments, the control system 34 may utilize the second temperature 117 and/or the light-induced change in temperature 112 to determine the fluid temperature (e.g., using one or more algorithms that correlate the second temperature 117 and/or the light-induced change in temperature 112 to the absolute temperature of the cap 54 and/or the exhaust gas 24).

The control system 34 may then compare the light-induced change in temperature 112 to an expected light-induced change in temperature to determine the condition of the temperature sensor 20. The light-induced change in temperature 112 is expected to vary in accordance with Planck's law (e.g., a Planck radiation curve 115). The Planck radiation curve 115, as well as other data related to the emitted light and the expected light-induced change in temperature, may be predetermined and stored, such as in the memory circuitry 36, for access and use by the control system 34 to assess the condition of the temperature sensor 20.

In some embodiments, if the light-induced change in temperature 112 does not correspond to the expected light-induced change temperature (e.g., outside of a predetermined threshold), the condition of the temperature sensor 20 may be determined as broken, missing, and/or deteriorated, and the control system 34 may provide an alarm. Additionally, the controller may be configured to provide an alarm if the light-induced change in temperature 112 varies from the expected light-induced change in temperature by more than a threshold (e.g., predetermined threshold). The threshold may be set to 1 K, 5 K, 20 K, 20 K, or any other suitable threshold for determined the light-induced change in temperature 112 has varied from the expected light-induced change in temperature. In certain embodiments, the threshold may be less than 20 K, or preferably, less than 10 K, less than 5 K, or less than 1 K. In certain embodiments, the threshold is set to smaller values for higher temperature measurements. Additionally, any other suitable threshold for determining if the light-induced change in temperature is within expected limits can be used. The controller may additionally or alternatively provide the alarm if the light-induced change in temperature 12 varies from the expected light-induced change in temperature by more than 1, 3, 5, 10, 20, 30, 40, or 50 percent, any other suitable difference useful for detecting an undesired deviation between the light-induced change in temperature 112 and the expected light-induced change in temperature.

In some embodiments, if the light-induced change in temperature 112 corresponds to the expected light-induced change in temperature, a fluid temperature of the exhaust gas 24 may be determined (e.g., using one or more algorithms) and provided for visualization by an operator and/or for use in controlling the gas turbine system 10. In some embodiments, both the first temperature 114 and the light-induced change in temperature 112 may be utilized to calculate the fluid temperature. In this manner, the control system 34 may correct and/or adjust the fluid temperature readings to increase reliability of the measurements.

The control system 34 may calculate the temperature of the fluid continuously, periodically (e.g., every 0.5, 1, 3, 5, 10, 30, 60, 90 minutes or more), or based on an operator input to the control system 34. The control system 34 may similarly calculate the condition of the temperature sensor 20. In particular, the control system 34 may output a light drive signal to the light source 90 at continuous times, periodically at a predetermined interval, or at requested times to initiate and/or enable determination of the condition of the temperature sensor.

Figure 5:
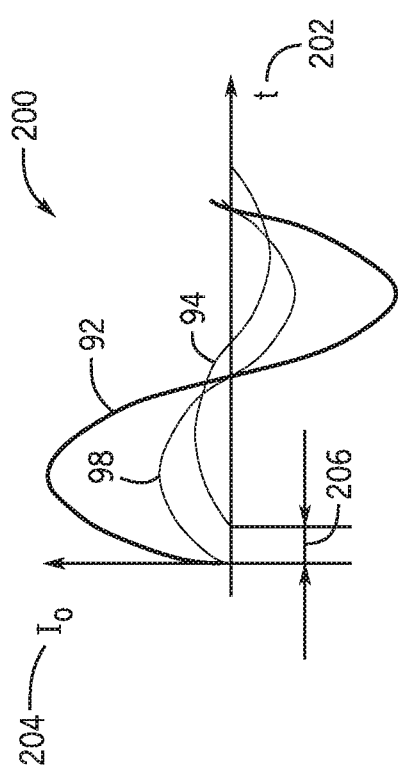
FIG. 5 is a graphical representation of emitted light, emitted radiation, and in-phase reflected light associated with the temperature sensor of FIG. 1, in accordance with an embodiment of the present disclosure.

FIG. 5 is a graphical representation 200 of the emitted light 92 and the emitted radiation 94, which is out-of-phase with the emitted light 92 (e.g., by phase shift 206). As shown in FIG. 5, at least some of the emitted light 92 (e.g., in-phase light 98) may return to the detector 96 due to reflections (e.g., Fresnel reflections) or other features of the optical path. The graph 200 illustrates examples of relationships between intensity and phases of the light. As illustrated, a horizontal axis 202 represents time and a vertical axis 204 represents the intensity of light. The emitted light 92, the emitted radiation 94, and the in-phase light 98 may also be modulated at the same frequency.

As shown, the emitted radiation 94 is shifted by the phase shift 206, while the in-phase light 98 is in-phase with the emitted light 92. Accordingly, the control system 34 may therefore identify and/or isolate signals related to the emitted radiation 94 from signals related to the in-phase light 98 (e.g., via heprodyne detection). The phase-shift measurement methods may include non-split signal methods, split signal methods, split signal with zero-out methods, or another method that identifies the phase shift of back scattered light. As discussed above, the control system 34 may calculate the light-induced change in temperature 112 based on the radiation 94, and thus determine the condition of the temperature sensor 20. In certain embodiments, the in-phase light 98 may be removed and/or excluded from calculations of temperature or the light-induced change in temperature 112. In some embodiments, the in-phase light 98 may be used to identify a condition of the temperature sensor 20. For example, if the in-phase light 98 is not received at the detector 96, the control system 34 may determine that optical components of the temperature sensor 20 (e.g., a lens, the light pipe, etc.) are not functioning properly. Further, because the radiation 94 and the in-phase light 98 are modulated, the control system 34 may identify and/or isolate signals related to it from signals related to the emitted radiation 80 of the cap 54. In some embodiments, if no modulated light (e.g., the radiation 94 and the in-phase light 98) is detected by the detector 96, the control system 34 may determine that the cap 54 is missing or that the temperature sensor 20 is otherwise not functioning properly. With each type of radiation and/or light individually recognized, the condition of the temperature sensor 20 and/or the temperature of the fluid (e.g., the calculated temperature) may be readily determined, as described herein.

Thus, the temperature sensor 20 may enable determination of a condition of the temperature sensor (e.g., whether the temperature sensor 20 and/or cap 54 is broken, healthy, present, missing, or a combination thereof). For example, if the temperature sensor 20 is healthy, the control system 34 will receive signals related to the emitted radiation 94, the in-phase light 98, and the emitted radiation 80, and the calculated light-induced change in temperature 112 will correspond to the expected light-induced change in temperature, as set forth above (e.g., the first temperature 114 and the light-induced change in temperature 112 will comply with the Planck radiation curve 115). If the temperature sensor 20 has a broken and/or missing cap or is otherwise not functioning properly, radiation similar to radiation 80 may still be detected by the detector 96 and a first temperature may be calculated. However, in certain embodiments, the radiation 94 and/or the in-phase light 98 may not be detected, and/or the light-induced change in temperature 112 may not correspond to the expected light-induced change in temperature according to Planck's law. Therefore, the control system 34 may identify that the cap 54 is broken and/or missing and/or provide an alarm. For example, if the sensor 20 is no longer reliable (e.g., if the cap 54 has deteriorated), the light-induced change in temperature 112 may not be within a threshold of the expected light-induced change in temperature and the control system 34 may determine that the measurements are unreliable and/or provide an alarm. It is advantageous to identify conditions of temperature sensors 20 so that reliable information may be used to control the system 10.

Figure 6:
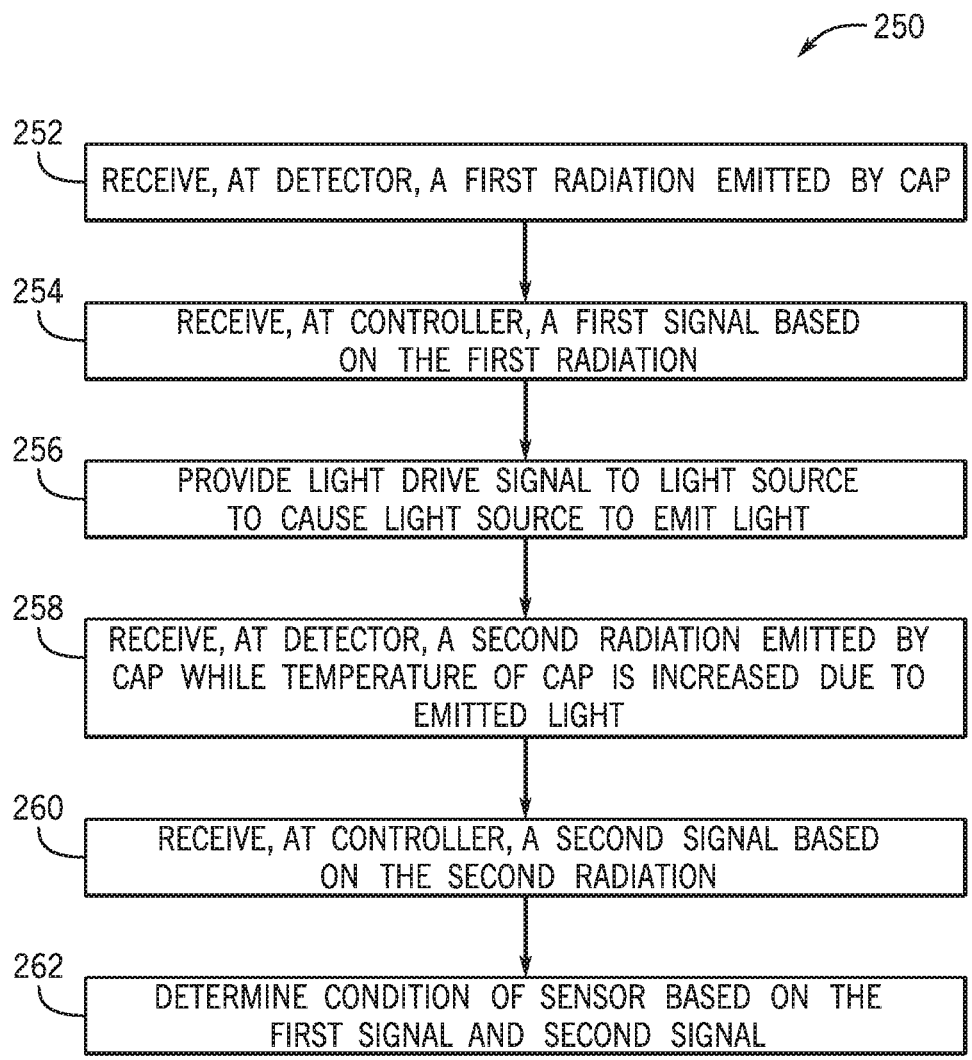
FIG. 6 is a flow diagram of an embodiment of a method for determining a condition of the temperature sensor of FIG. 1, in accordance with an embodiment of the present disclosure.

FIG. 6 is a flow diagram of an embodiment of a method 250 for determining a condition of the temperature sensor 20. In certain embodiments, steps of the method 250 are performed by the control system 34 and/or by the independent controller of the temperature sensor 20. As shown, the method 250 begins with receiving, at the detector 96, the radiation 80 emitted by the cap 54 of the temperature sensor 20 (block 252). The cap 54 is positioned within a flow path 22 of the fluid, such as the flow path 22 of the exhaust gas 24. The fluid (e.g., exhaust gas 24) transfers energy to the cap 54, which is made from a material configured to emit the radiation 80 from the inner surface 66 of the cap 54 based on a temperature of the material. The method 250 also includes receiving, at the control system 34, a first signal generated by the detector 90 based on the radiation 80 (block 254).

The method 250 further includes providing, using the control system 34, a light drive signal to cause a light source to emit light (e.g., modulated emitted light 92, constant emitted light) toward the inner surface 66 of the cap 54 (block 256). Then, the emitted light 92 travels through the light pipe 70 and may increase the temperature of the cap 54 (e.g., due to heat transfer), which is the light-induced change in temperature. The method 250 additionally includes receiving, at the detector 96, a second radiation including the emitted radiation 94 due to the emission of the light into the cavity 60 defined by the cap 54 (block 258). The modulation of the light may facilitate or enable the control system 34 to distinguish the emitted radiation 94 from the emitted radiation 80, which is not modulated.

Further, the method 250 also includes receiving, at the control system 34, a second signal generated by the detector 96 based on the radiation 94 (block 260). The control system 34 may then calculate a first temperature based on the first signal and/or calculate a light-induced change in temperature based on the second signal. The control system 34 may also determine an expected light-induced change in temperature based on the first temperature and Planck's law, and then compare the light-induced change in temperature to the expected light-induced change in temperature.

The method 250 additionally includes determining the condition of the temperature sensor 20 based on the first signal and the second signal (block 262). For example, the control system 34 may determine the condition of the temperature sensor based on a difference between the light-induced change in temperature and the expected light-induced change in temperature. The control system 34 may compare the difference to a predetermined threshold and provide an alarm when the difference exceeds the predetermined threshold. The control system 34 may determine whether the cap is present, missing, healthy, damaged, or a combination thereof and/or provide an appropriate output (e.g., visual or audible output or a control signal). In some embodiments, the control system 34 may determine that the temperature sensor 20 is functioning properly if the difference does not exceed the predetermined threshold, and may calculate and/or output a calculated fluid temperature based on the first temperature.

Figure 7:
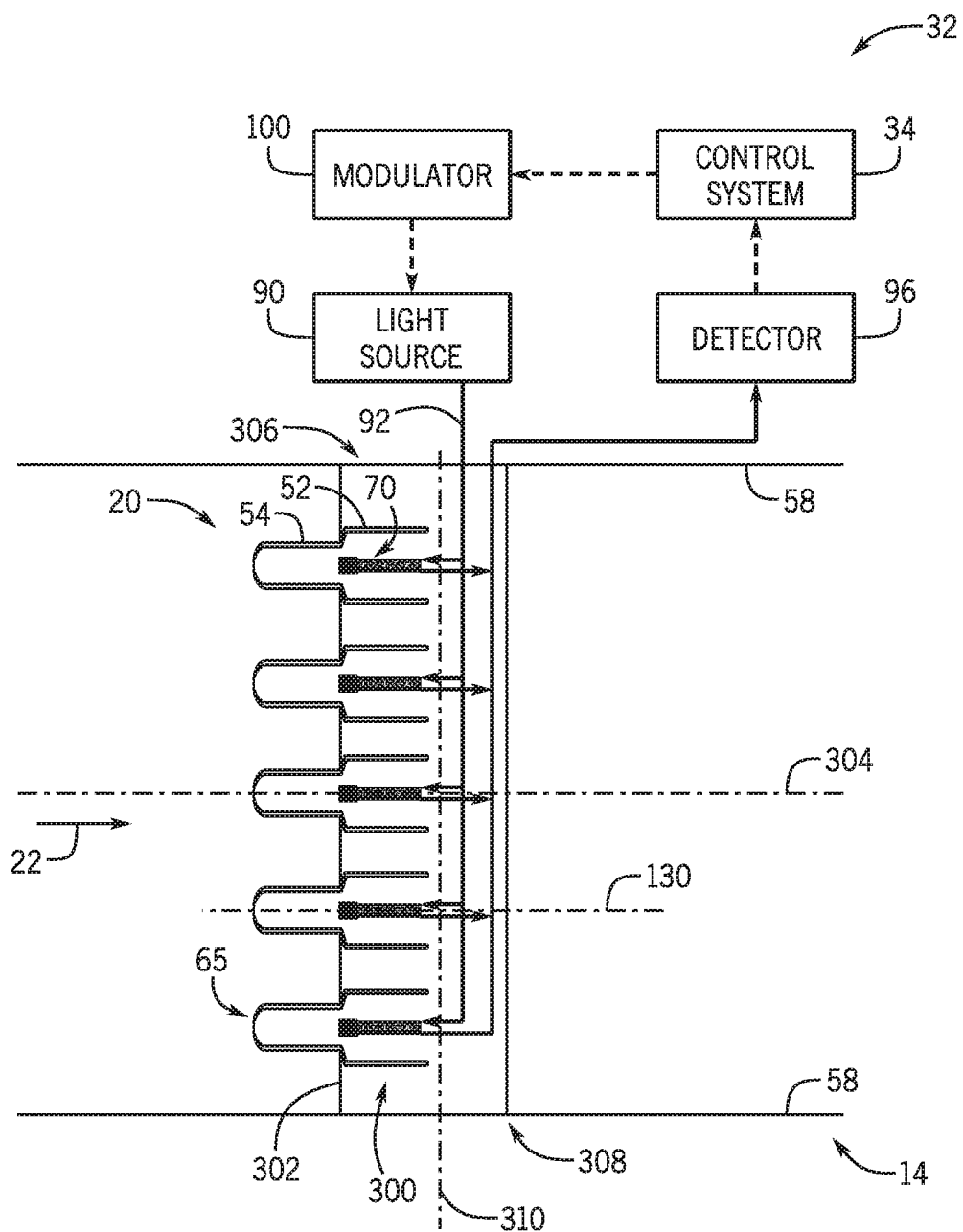
FIG. 7 is a schematic diagram of a rod and multiple temperature sensors arranged in a flow path of a fluid, in accordance with an embodiment of the present disclosure.

FIG. 7 illustrates a cross-section of the temperature sensor of multiple temperature sensors 20 arranged in the flow path 22 of the fluid. In particular, the depicted temperature sensors 20 contain light pipes 70, housings 52, and caps 54. As illustrated, the temperature sensors 20 may share a single monitoring system 32 connected to each light pipe 70. In other embodiments, the temperature sensors 20 may have their own complete monitoring systems 32, may share only the control system 34 (i.e., have their own light source 90, detector 96, and/or modulator 100), or may share a different quantity and type of components of the monitoring system 32.

As shown, the sensors 20 are coupled to a rod 300 (e.g., frame, hollow cylinder, hollow rectangular prism). The rod 300 may extend across the flow path 22 of the combustor 14 or other area where it is desirable to measure the temperature (e.g., engine oil reservoirs, heat exchangers). In some embodiments, the rod 300 may only extend across a portion of the flow path 22. The temperature sensors 20 may be embedded within the rod, such that the caps 54 extend from a surface 302 (e.g., a front face or upstream-facing surface) of the rod 300. Alternatively, the sensors 20 may be coupled to the surface 302 of the rod 300. In the present embodiment, the sensors 20 are shown in cross section. Additionally, the inner components of the sensors 20 (e.g., the light pipe 70, the connecting cables, all or a portion of the monitoring system 32) may be disposed inside the rod 300 or may be disposed at a location outside the rod 300.

The sensors 20 are configured to determine the first temperature, the second temperature, and/or the condition of the sensors 20 in the same manner as the sensors 20 of FIGS. 2 and 3. The control system 34 may receive individual signals for each of the temperature sensors 20. Accordingly, the control system 34 may construct a temperature profile of the fluid through the combustor 14.

As shown, the rod 300 may extend longitudinally across the flow path 22 of the combustion chamber so that the longitudinal axis 130 of at least one of the sensors 20 is approximately parallel to the flow path 22 of the fluid through the combustor 14. Described another way, the rod 300 may extend between two surfaces 58 (e.g., opposed surfaces) of the combustor 14 and a first end 306 is coupled to one surface 58 and a second end 308 coupled to another surface 58. A longitudinal axis 310 of the rod 300 may extend in a direction transverse (e.g. cross-wise, perpendicular) to the direction of the flow path 22 and/or the longitudinal axis 130 of at least one sensor 20 and/or an axis 304 of the combustor 14.

Technical effects of the disclosure include the monitoring system 32 having the temperature sensor 20. The temperature sensor 20 may be used to measure a temperature of a fluid (e.g., the exhaust gas 24) in high temperature environments (e.g., in the combustor 14 of the gas turbine engine 10) that may be unsuitable for thermocouple temperature sensors. The cap 54 of the temperature sensor 20 may be manufactured from refractory materials (e.g., ceramic materials) that may tolerate high temperatures generally seen in, for example, gas turbine systems, and gasification systems, among others. The temperature sensor 20 includes the cavity 56 defined by the cap 54, connected by the light pipe 70 to the detector 96. The control system 34 calculates the first temperature based on the radiation 80 emitted from the cap 54. The light source 90 sends the modulated emitted light 92 to reflect from the inner surface 66 of the cap, so that radiation 94 is emitted by the cap 54 and detected by the detector 96. The radiation 94 is modulated at the same frequency as the emitted light 92. The radiation 94 may be utilized to determine the light-induced change in temperature. The control system 34 may also determine the expected light-induced change in temperature based at least in part on the known intensity of the emitted light 92, the first temperature, and Planck's law. The relationship between the light-induced change in temperature and the expected light-induced change in temperature may be analyzed to determine if the temperature sensor 20 is producing accurate measurements. Additionally, detection of the radiation 94 may be used to determine the condition of the temperature sensor 20. The temperature sensors disclosed herein may permit the user to obtain the condition of the temperature sensor 20 without having to disassemble components of the gas turbine system 10 and without relying on data produced by unhealthy/broken temperature sensors 20. The temperature sensors 20 may replace and/or supplement the use of thermocouples, for example, in temperature environments that may be outside a temperature threshold for thermocouple temperature sensors. Replacing the use of thermocouple temperature sensors for measuring temperatures in high temperature systems such as gas turbine system and gasification systems may decrease the overall costs associated with replacing thermocouples that have been exposed to temperatures above the their temperature limits.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a temperature sensor configured to measure a temperature of a fluid, the temperature sensor comprising:
      a housing supporting a light pipe and comprising a cap configured to be positioned within a flow path of the fluid, wherein the cap comprises a material configured to emit radiation based on a temperature of the material;
      a light source configured to emit light through the light pipe toward an inner surface of the cap to change the temperature of the material of the cap; and
      a detector configured to:
         receive the radiation emitted by the material of the cap;
         generate a first signal indicative of the temperature of the material of the cap based on the received radiation emitted by the material; and
         generate a second signal indicative of a light-induced delta temperature of the material of the cap, wherein the light-induced delta temperature is caused by the light emitted toward the inner surface of the cap; and
   a controller configured to:
      determine the temperature of the fluid based at least in part on the first signal; and
      determine a status condition of the temperature sensor based on the first signal and the second signal.

2. The system of claim 1, wherein the controller is configured to determine the status condition of the temperature sensor by comparing the light-induced delta temperature to an expected light-induced delta temperature.

3. The system of claim 2, wherein the controller is configured to:
   determine a difference between the light-induced delta temperature and the expected light-induced delta temperature;
   compare the difference to a predetermined threshold; and
   provide an output indicative of the status condition of the temperature sensor based on the comparison.

4. The system of claim 3, wherein the controller is configured to provide an alarm when the difference exceeds a predetermined threshold.

5. The system of claim 1, comprising a modulator configured to modulate the light emitted by the light source, wherein the detector is configured to distinguish the radiation emitted by the material of the cap into the first signal and the second signal based on a modulation of the light by the modulator.

6. The system of claim 1, wherein the cap comprises ceramic, stainless steel, oxides, silica, magnesia, carbides, zirconia, graphite, boron nitride, corrosion-resistant metal alloy, tungsten, vanadium, or a combination thereof.

7. The system of claim 1, wherein a longitudinal axis of the cap is substantially parallel to the flow path of the fluid.

8. The system of claim 1, wherein the controller is configured to provide a light drive signal to cause the light source to emit the light periodically at a predetermined interval.

9. The system of claim 1, comprising a gas turbine system comprising a combustor, and the cap of the temperature sensor is positioned within the flow path of the fluid within the combustor.

10. A system, comprising: a temperature sensor configured to measure a temperature of combustion gases generated in a combustor based on a measurement of infrared radiation, wherein the temperature sensor comprises a housing supporting a light pipe and comprising a cap configured to be positioned within a flow path of the combustion gases, and the cap comprises a material that emits the infrared radiation to the light pipe based on a temperature of the material, wherein the system is configured to determine a status condition of the temperature sensor based on the infrared radiation emitted to the light pipe by: emitting light through the light pipe toward an inner surface of the cap to change the temperature of the material of the cap; and determining the status condition based on a light-induced delta temperature of the material of the cap, wherein the light-induced delta temperature is caused by the light emitted toward the inner surface of the cap.

11. The system of claim 10, wherein a rod is configured to extend at least partially into the flow path of the combustion gases generated in the combustor and the temperature sensor is coupled to the rod, wherein a longitudinal axis of the cap is substantially parallel to the flow path of the combustion gases, and wherein a longitudinal tip portion of the cap is thinner than wall portions of the cap.

12. The system of claim 10, comprising a gas turbine engine having the combustor and the temperature sensor, wherein the material of the cap is a refractory material comprising ceramic, stainless steel, oxides, silica, magnesia, carbides, zirconia, graphite, boron nitride, corrosion-resistant metal alloy, tungsten, vanadium, or a combination thereof.

13. The system of claim 10, wherein the material of the cap comprises an external wall of the cap, and wherein the external wall is directly exposed to a flow path of the combustion gases.

14. A method, comprising:
receiving, at a detector, a first radiation emitted by a cap of a temperature sensor positioned within a fluid, wherein the cap comprises a material configured to emit radiation based on a temperature of the material;
receiving, at a controller, a first signal generated by the detector based on the first radiation emitted by the cap of the temperature sensor;
providing, using the controller, a light drive signal to cause a light source to emit light toward an inner surface of the cap to increase the temperature of the cap;
receiving, at the detector, a second radiation emitted by the cap of the temperature sensor while the temperature of the cap is increased due to the emitted light from the light source;
receiving, at the controller, a second signal generated by the detector based on the second radiation emitted by the cap of the temperature sensor while the temperature of the cap is increased due to the emitted light from the light source; and
determining, using the controller, a status condition of the temperature sensor based on the first signal and the second signal.

15. The method of claim 14, comprising calculating a first temperature of the cap based on the first signal, calculating a light-induced delta temperature based on the second signal, calculating an expected light-induced delta temperature based at least in part on the first temperature, and determining the status condition of the temperature sensor based on a difference between the light-induced delta temperature and the expected light-induced delta temperature, using the controller.

16. The method of claim 15, comprising comparing the difference to a predetermined threshold and providing an alarm when the difference exceeds the predetermined threshold, using the controller.

17. The method of claim 14, wherein a longitudinal axis of the cap is substantially parallel to the flow path of the fluid.

18. The method of claim 14, comprising:
modulating, using a modulator, the light emitted by the light source at a predetermined frequency; and
distinguishing, at the detector, the first signal from the second signal based on a modulation of the light by the modulator.

19. The method of claim 14, comprising modulating, using a modulator, the light emitted by the light source at a predetermined frequency, and determining that the status condition of the temperature sensor is impaired if no in-phase reflected light is received at the detector.

20. The method of claim 14, wherein determining the status condition of the temperature sensor comprises determining whether the cap is present, missing, healthy, damaged, or a combination thereof.

21. A system, comprising:
a temperature sensor configured to measure a temperature of combustion gases generated in a combustor, wherein the temperature sensor comprises a housing supporting a light pipe and comprising a cap configured to be positioned within a flow path of the combustion gases, and the cap comprises a material that emits infrared radiation to the light pipe based on a temperature of the material,
wherein the housing comprises a stepped portion formed between the light pipe and the cap, and wherein the cap defines a cavity between the stepped portion and an inner surface of the cap.

* * * * *